H. W. VAN MEETEREN.
MODE OF AND MEANS FOR ASSEMBLING PNEUMATIC OR ELASTIC TIRES IN RELATION TO RIMS OR WHEELS.
APPLICATION FILED SEPT. 21, 1915.

1,268,185.

Patented June 4, 1918.
2 SHEETS—SHEET 1.

Inventor:—
Harry W. van Meeteren

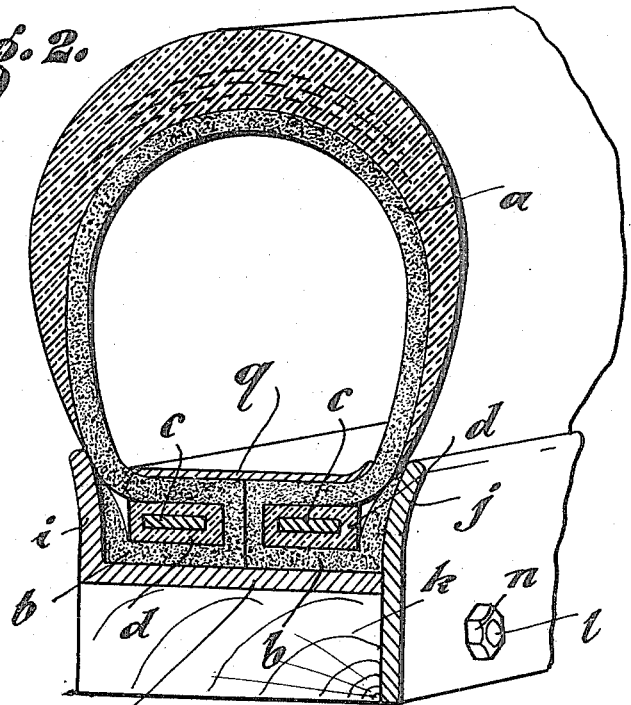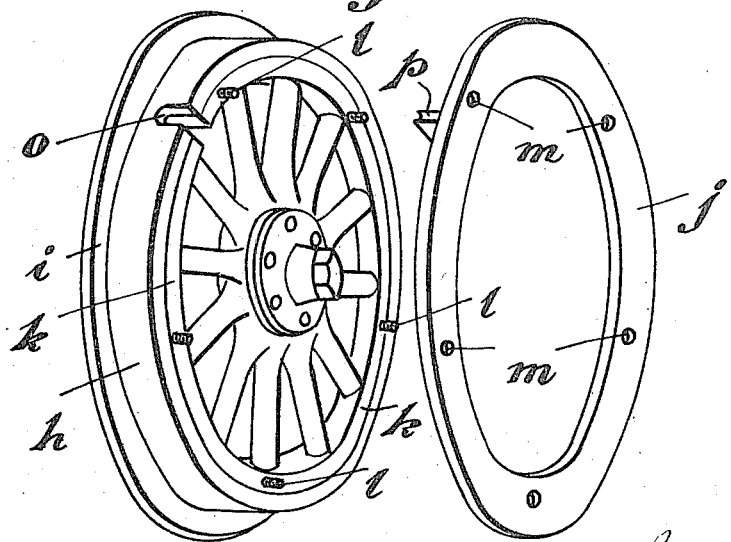

UNITED STATES PATENT OFFICE.

HARRY WILLIAM van MEETEREN, OF BIRMINGHAM, ENGLAND, ASSIGNOR OF ONE-THIRD TO AMOS EDWARDS AND ONE-THIRD TO HENRY HEADLEY, BOTH OF BIRMINGHAM, ENGLAND.

MODE OF AND MEANS FOR ASSEMBLING PNEUMATIC OR ELASTIC TIRES IN RELATION TO RIMS OR WHEELS.

1,268,185.      Specification of Letters Patent.      Patented June 4, 1918.

Application filed September 21, 1915. Serial No. 51,812.

*To all whom it may concern:*

Be it known that I, HARRY WILLIAM VAN MEETEREN, a subject of the Queen of Holland, residing at 35 Poplar road, Edgbaston, Birmingham, in the county of Warwick, England, engineer, have invented a certain new and useful Mode of and Means for Assembling Pneumatic or Elastic Tires in Relation to Rims or Wheels, of which the following is a specification.

This invention comprises a new or improved mode of and means for assembling a pneumatic or elastic tire in relation to a rim or wheel.

A feature of the present invention lies in the fact that it provides a member essentially in the nature of a pneumatic tire cover adapted to be assembled in relation to a rim or wheel, and which pneumatic tire cover can be fitted with an inner tube and inflated before it is assembled in relation to the rim or wheel. Thus the pneumatic tire itself can be employed in lieu of a spare rim; it can be carried upon the car in an inflated condition, and should a puncture or burst be experienced, the damaged tire can be removed from the road wheel, the already inflated tire can be assembled in relation thereto, and thus the advantage of interchangeability is attained in a particularly novel, simple, efficient, and useful manner.

According to a further feature of the present invention, a pneumatic tire cover is, in the parts adjacent to the joint or division which is provided for the insertion of the inner tube reinforced in a characteristic manner, whereby these parts of the tire in the vicinity of the joint or division may be pressed or coupled together in such a manner as to satisfactorily contain the tube in an inflated condition. For this purpose, in a convenient embodiment of the present invention, there is disposed in each portion of the tire cover adjacent to, or in the vicinity of, the joint or division, an endless band or ribbon in the nature of a short cylinder. This endless band or ribbon, apart from preventing expansion or contraction of the part of the tire cover in which it is incorporated, serves to so support or reinforce this part of the tire cover that the latter, when laterally coupled to the other corresponding portion of the tire cover, forms, with such other portion, a rigid base or foundation which is enabled to operate as the equivalent of a carrier rim.

In order that this invention may be readily understood and more easily carried into practice, reference may be had to the explanatory sheet of drawings, upon which:—

Fig. 2 illustrates the parts shown in Fig. 1 in their assembled positions.

Fig. 3 illustrates the separate parts of the wheel, a section of which is shown in Figs. 1 and 2.

Figure 1:
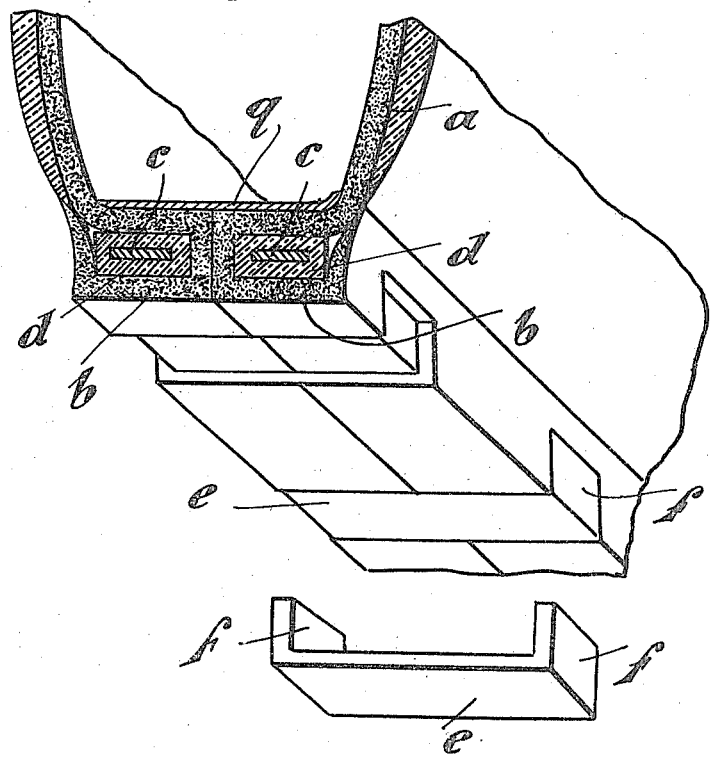
Figure 1 illustrates separately the various parts of my invention according to a convenient form.
Figure 1:
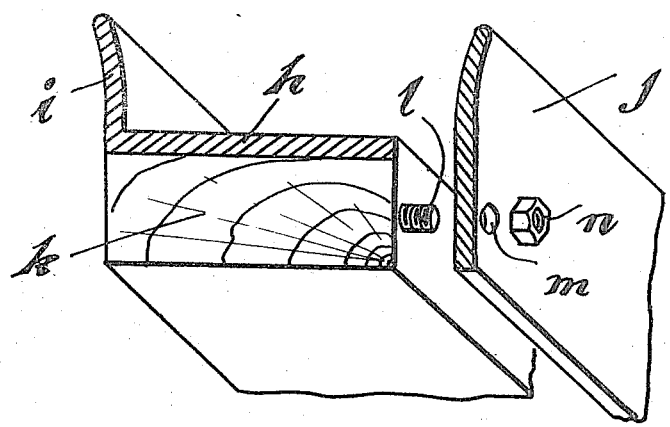

In a convenient embodiment of the present invention, I manufacture a tire cover $a$ with two square, substantially square, rectangular, or substantially rectangular base portions $b$ $b$ one on each side of the joint or division, which portions, when rectangular or substantially rectangular, may be disposed with their major dimensions transversely of the plane of the wheel, and in the interior of each of such portions I incorporate an endless steel band or ribbon $c$. This band is incorporated with its wall disposed transversely of the plane of the wheel, and it is adapted to so support the surrounding portion of the tire as to retain the latter in a fixed position from movement in the plane of the wheel, while permitting of such portion moving or being moved toward or away from the central plane of the wheel, when it is desired to insert or remove the inner tube.

The band or tape $c$ is encircled with a rubber covering $d$ which completely covers both its faces, and which also extends around its edges, the rubber covering being thus of a tubular nature. Around the rubber covering is the canvas portion of the tire, which canvas portion advantageously completely encircles the rubber covering and externally forms the square or rectangular portion of the tire aforementioned.

The tire cover may be composed of, or may involve, a series of layers of canvas which are suitably incorporated at the inner surface of the tread portion of the tire, and which layers of canvas are continued completely around the rubber covered bands c to form the base portions of the tire, the whole being vulcanized and (or) otherwise suitably secured. The layers of canvas may extend first in relation to the outer surface of the rubber covered bands c, then around the inner edge thereof (i. e. the edge nearest to the mid-plane of the wheel), then in relation to the inner surface of the band, and lastly in relation to the outer edge of the band to a point at which the extremities or edges of the canvas layers adjoin such layers to form a loop encircling the rubber covered bands.

Externally of the canvas layers, rubber, with or without canvas reinforcements, may be incorporated around the whole of the tire, with the exception of the base portions thereof, such outer covering being conveniently of maximum thickness at the tread and tapering or decreasing in thickness around the sides, conveniently at the point at which the extreme edge of the canvas layers occurs.

$q$ is an annular flap of canvas or other suitable material secured to one of the base portions $b$ and adapted to cover the division.

Suitable means are incorporated for laterally coupling the base portions of the tire together, and for retaining them in such intimate contact or engagement. One method providing for this, which is described by way of example, and to which the invention is not in any way restricted, is by the use of a series of short channel members or sections $e$ the flanges or side webs $f$ of which are adapted to externally embrace the base portions of the tire. These channel members $e$ may be assembled if desired in relation to appropriately recessed parts $g$ of the base portions of the tire, so that they do not produce any surface projections.

The tire cover is then adapted to be assembled in any suitable manner within a rim conveniently of a composite form. This rim may comprise a cylindrical steel band $h$ forming the base of the rim and having an integral web or flange $i$ on one side, a separable or detachable web or flange in the nature of a plate or ring $j$ being adapted to be secured in relation to the other side of the cylindrical portion of the steel rim. The cylindrical base of the tire is adapted to rest upon the cylindrical portion $h$ of the rim, and the integral and separable flanges are adapted to engage with each side of the base portion of the tire. The cylindrical portion of the rim may be mounted upon a suitable wooden or other felly $k$, into which felly the separable portion $j$ of the rim may, if desired, be secured. In one method of attaching the portion $j$ projecting screwed stems $l$ are fixed within the felly $k$ and adapted to pass through perforations $m$ in the separable flange, which latter is secured by nuts $n$ assembled outside of the flange upon the screwed stems.

In the cylindrical portion of the rim member at one point in its circumference, a lateral groove $o$ or slot is furnished, which groove or slot may also be provided in the wooden carrier felly $k$ where such is present, such slot being adapted to accommodate the valve. A lug $p$ may be provided on the separable ring portion of the rim adapted to occupy that part of the slot unoccupied by the valve. The valve engaging with this slot may assist in preventing creep of the tire cover in relation to the rim, but other and additional means for preventing this creeping may be incorporated. With the object of satisfactorily preventing creeping the separable portion $j$ may be adapted in conjunction with the fixed flange $i$ to effectively grip the base portions $b$ of the tire.

While in the course of describing the nature of this invention, I have particularly described certain embodiments, I wish it particularly to be understood that my invention is not in any way limited to the descriptions which I have included.

What I claim as my invention and desire to secure by Letters Patent is:—

A pneumatic or elastic tire cover having solid block-like base portions composed essentially of non-metallic material and extending in uninterrupted continuity around the entire circumference of the tire, a continuous, endless and uninterrupted circumferential metallic reinforcing member of elongated cross-section incorporated within each block-like base portion, permanently and completely embedded throughout its entire circumference within the interior of the block-like base portion for guarding the latter against lateral bending, and quickly releasable connecting means adapted to couple the base portions together prior to the assemblage of the cover in its carrier rim, said connecting means being adapted when in engagement to permit of the block-like base portions being gripped or clamped between the separable parts of a divisible carrier rim.

In witness whereof I have hereunto set my hand in the presence of two witnesses.

HARRY WILLIAM van MEETEREN.

Witnesses:
ARTHUR HENRY BROWN,
HOLLIS BROWN.